(12) United States Patent
Palmer et al.

(10) Patent No.: US 12,203,505 B2
(45) Date of Patent: Jan. 21, 2025

(54) LARGE ROLLING BEARING

(71) Applicant: Liebherr-Components Biberach GmbH, Biberach an der Riss (DE)

(72) Inventors: Andreas Palmer, Riedlingen (DE); Robert Zell, Schemm (DE); Markus Ruf, Bad Waldsee (DE); Michael Fuchs, Herbrechtingen (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 0 days.

(21) Appl. No.: 17/448,784

(22) Filed: Sep. 24, 2021

(65) Prior Publication Data

US 2022/0010839 A1    Jan. 13, 2022

Related U.S. Application Data

(63) Continuation of application No. PCT/EP2020/055821, filed on Mar. 5, 2020.

(30) Foreign Application Priority Data

Mar. 26, 2019   (DE) .................... 20 2019 101 697.3

(51) Int. Cl.
*F16C 33/58*   (2006.01)
*F03D 80/70*   (2016.01)
*F16C 19/49*   (2006.01)
*F16C 33/60*   (2006.01)

(52) U.S. Cl.
CPC ............ *F16C 33/583* (2013.01); *F03D 80/70* (2016.05); *F16C 19/49* (2013.01); *F16C 33/60* (2013.01); *F16C 2300/14* (2013.01); *F16C 2360/31* (2013.01)

(58) Field of Classification Search
CPC ........ F16C 19/49; F16C 33/583; F16C 33/60; F16C 2300/14; F16C 2360/31; F03D 80/70
See application file for complete search history.

(56) References Cited

U.S. PATENT DOCUMENTS

| 5,074,677 A | * | 12/1991 | Andree | .................. F16C 19/381 384/622 |
| 8,764,300 B2 | * | 7/2014 | Errard | ..................... F16C 19/49 384/619 |
| 2009/0175724 A1 | * | 7/2009 | Russ | ........................ F03D 80/70 416/174 |

(Continued)

FOREIGN PATENT DOCUMENTS

| CN | 108291577 | 7/2018 |
| DE | 2648144 | 4/1978 |

(Continued)

*Primary Examiner* — Alan B Waits
(74) *Attorney, Agent, or Firm* — Levine Bagade Han LLP

(57) ABSTRACT

The invention relates to a rolling bearing, in particular a center-free large rolling bearing, comprising two concentric races, of which one race has a groove open toward the other race and the other race has a lug ring, which engages in said groove, the lug ring being supported on the groove by means of at least two thrust bearings and at least one radial bearing, said axial bearings being designed as roller bearings, all the radial bearings being designed as ball bearings.

14 Claims, 1 Drawing Sheet

(56) References Cited

U.S. PATENT DOCUMENTS

| | | | |
|---|---|---|---|
| 2010/0046870 A1* | 2/2010 | Shibuya | F16C 19/505 384/490 |
| 2010/0067838 A1* | 3/2010 | Frank | F03D 80/70 384/477 |
| 2012/0243819 A1 | 9/2012 | Errard et al. | |
| 2014/0199171 A1 | 7/2014 | Jepsen | |
| 2016/0025068 A1* | 1/2016 | Frank | F16C 19/188 384/492 |

FOREIGN PATENT DOCUMENTS

| | | |
|---|---|---|
| DE | 3104097 | 9/1982 |
| DE | 102005026141 | 12/2006 |
| DE | 202007011577 | 11/2007 |
| DE | 102007052383 | 5/2008 |
| DE | 102009004991 | 7/2010 |
| DE | 102010027011 | 1/2012 |
| DE | 102011008958 | 7/2012 |
| EP | 2092204 | 8/2012 |
| RU | 1820929 | 6/1993 |
| WO | WO 2007/112748 | 10/2007 |
| WO | WO 2008/088213 | 7/2008 |
| WO | WO 2015/055317 | 4/2015 |
| WO | WO 2020/193097 | 10/2020 |

\* cited by examiner

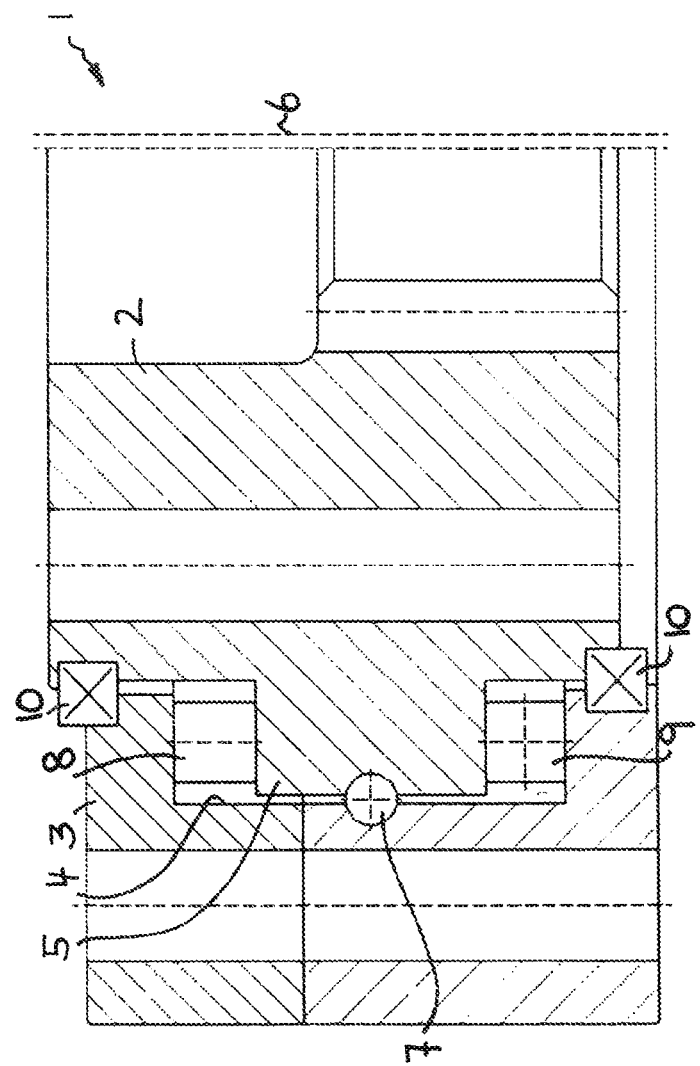

LARGE ROLLING BEARING

CROSS-REFERENCE TO RELATED APPLICATIONS

This application is a continuation of International Patent Application Number PCT/EP2020/055821 filed Mar. 5, 2020, which claims priority to German Patent Application Number DE 20 2019 101 697.3 filed Mar. 26, 2019, the contents of which are incorporated herein by reference in their entireties.

BACKGROUND

The present invention relates to a rolling bearing, in particular a center-free large rolling bearing, comprising two concentric races, of which one race has a groove open toward the other race and the other race has a lug ring, which engages in said groove, the lug ring being supported on the groove by means of at least two axial bearings and at least one radial bearing, said axial bearings being configured as roller bearings.

With large rolling bearings for special applications, considerable bending moments and tilting forces sometimes act on the bearing rings which can lead to twisting and to an angular offset of the ball races with respect to one another such that premature wear occurs in the region of the races and of the roller bodies. Large rolling bearing of this type can measure several meters in diameter and can be employed on cranes, for instance, to pivot and support the support mast of a ship crane or of a harbor crane, wherein not only vertical forces but also bending moments or tilting loads have to be absorbed here. Gondola bearings and blade bearings of wind turbines, which are used to adjust the gondola on the tower of the wind turbine or the rotor blades on the rotor hub, are also subject to large bending moments and changing loads.

In this case, the problems of twisting and tilting are further aggravated when the middle or center of the bearing has to be kept free to permit the component that is to be supported, such as said crane support mast or other elements, to pass through the bearing, for example so that a rotary drive can be attached to the part that is to pass through. Due to a lack of space, the bearing rings of a center-free large rolling bearing such as this cannot be manufactured in any desired size, especially in the radial direction, and so the area moments of inertia that can be achieved in the races are limited.

Such large rolling bearing are often used, for example, as crane tower or crane mast bearings or rotor blade bearings for adjusting the pitch angle of the rotor blades of wind turbines and remain stationary for a large part of their operating or service life, but are nevertheless subjected to high loads. In light of the large proportion of downtime and yet high loads, it is not entirely simple to prevent fatigue-related deformations and surface damage to the tracks and rolling elements in the long term and to ensure that they start up and rotate smoothly from a standstill, especially since the rotational speeds are quite low. To be able to absorb these high loads at a standstill without any remaining deformations on the tracks and/or rolling elements while nevertheless ensuring a smooth start from the standstill, cylindrical roller bearings with very large cylinder diameters are often used which, in contrast to needle roller bearings that have very small rolling element diameters or to ball bearings, exhibit a certain elasticity that can more effectively distribute loads and can achieve smaller surface pressures. However, space problems can arise in this type of cylindrical roller bearings with quite large cylinder diameters, since cylindrical roller bearing of this kind require a lot of installation space.

A large rolling bearing of said aforementioned type is shown, for example, in document EP 20 92 204 B 1, according to which the lug ring of the one bearing race should be clamped in place by two axial bearings lying opposite each other and two radial bearings lying opposite each other in the groove of the other race, wherein the oppositely disposed axial bearings and radial bearings should prevent undesirable deformation of the lug ring and should prevent the races from separating in the radial direction. A similar large rolling bearing and its installation situation on the support mast of a ship crane is disclosed in document WO 2008/088 213 A2. While the cited documents deal substantially with the problems associated with the separation of the radial bearings as a consequence of the twisting of the bearing races and seek to prevent a lifting of the radial bearings by clamping the lug ring from opposite sides of the lateral surface, it is still possible for canting and twisting to occur in the region of the axial bearings.

Generally, the vertical crane loads and the corresponding reaction forces in the crane mast support still account for a large or considerable part of the rotary bearing load, and so the lower axial bearing, which has to absorb the vertical crane loads, is typically configured in the form of a load-carrying cylindrical roller bearing, the cylindrical rollers of which have a relatively large cylindrical roller width in order to allow for a sufficiently large contact line and to keep surface pressures tolerable. On the other hand, such wide cylindrical roller bearings react critically to tilting or inclinations of the raceways relative to each other, since very quickly only a very small part of the cylindrical rollers actually bears a load. In this regard, it has already been proposed that the number of bearing assemblies used be increased to achieve further, more stable support for the lug ring. For example, document WO 2015/055317 A2 proposes the use of three axial bearings, two of which are arranged on one side of the lug ring and the third is arranged on the opposite side of the lug ring.

Such large rolling bearings are subjected to special stresses and therefore to even greater level of wear if they are not used as continuously rotating bearings but as pivot bearings that often remain in the same rotational position for a long period of time and are only rotated a little bit sporadically or at longer intervals, and are nevertheless subjected to changing external loads, especially in the case of rotor blade bearings of wind turbines, i.e. despite standing still. Such changing external loads on the bearing, which is at a standstill or not rotating, are caused for example by the rotation of the rotor of a wind turbine, in which the bearings are cyclically suspended and at a standstill and are cyclically exposed to stronger wind loads above and weaker wind loads below, or generally by changing wind forces. Such varying moments and forces lead to relative movements between rolling element and raceway due to elastic deformations of bearing and connection structure, which over a longer period of time can lead to wear of the bearing raceways and the rolling elements. It is worth mentioning that such relative movements between the rolling element and the raceway arise even though the bearing is not rotating, which leads to aggravated wear stress, since the relative movements often do not occur in the intended direction of the motion.

In particular, such relative movements caused by bearing deformations can displace the roller bodies, such as cylindrical rollers or tapered rollers, along the roller axis on the raceways, so that the roller along its line of contact with the raceway can get defected in the raceway.

In addition, the elastic deformation of the bearing rings can also cause tilting between the raceways adjacent to a rolling element, resulting in uneven support of the rolling elements along their line contact and further increasing said wear problem.

In order to get bearing wear under control, attempts have therefore been made to stiffen the bearing construction in such a way that the deformations and tilting mentioned do not arise or are greatly reduced. Substantially, this was achieved by making the bearings, including the roller bodies, sufficiently large and at the same time using relatively many rows of rolling bearings to clamp the nose ring without deformation or to hold it in such a way that it resists deformation. Nevertheless, ever larger and ever more rows of rolling bearings result in very large space requirements and high bearing weight, which is unacceptable in various space-constrained applications, especially in the blade bearing arrangement of the rotor blades of wind turbines.

It is therefore the underlying object of the present invention to provide an improved rolling bearing of the initially named kind which avoids disadvantages of the prior art and further develops the latter in an advantageous manner. In particular, a center-free large rolling bearing is to be created which, despite its compact and lightweight design, is less sensitive to wear at a standstill.

Said task is solved, according to the invention as claimed.

SUMMARY

It is therefore proposed to make at least the radial bearings less sensitive to multiaxial micromovements due to elastic deformations of the bearing rings and the adjacent construction during bearing being at a standstill. According to the invention, all radial bearings are configured as ball bearings. Surprisingly, increased wear resistance cannot be achieved by particularly high load carrying capacities in rolling operation, as shown by cylinders or tapered bearings, but by using balls as rolling elements, which can roll even when the bearing is at a standstill in the event of relative movements that deviate from the intended direction of movement of the rolling elements on the bearing races. Accordingly, radial bearings configured as ball bearings are less sensitive than rollers such as cylinders or cones because their spherical rolling elements roll in any direction of motion and unlike rollers cannot be displaced along a line of contact and in doing so, get defected. In addition, ball races can withstand tilting between raceways adjacent to a rolling element much better than roller races, which—when such tilting occurs— tend to carry unevenly along the line contact.

In a further development of the invention, only the radial bearings are configured as ball bearings, while the axial bearings can be configured as roller bearings in the form of cylindrical roller bearings and/or tapered bearings. The standstill wear that occurs when bearings are at a standstill under varying loads will primarily arise on the radial bearings, so that it is sufficient to design the radial bearings as ball bearings, whereas the axial bearings can remain roller bearings.

Due to the increased wear resistance against standstill wear, the rolling bearing can operate with only three bearings, namely two axial bearings and one radial bearing. In a further development of the invention, there are provided exactly one radial bearing and exactly two axial bearings.

The radial bearing in the form of a ball bearing can be of a single-row, or possibly of double-row or multi-row configuration. In particular, a single-row ball bearing is provided as the only radial bearing.

The two axial bearings can also be of a single-row, double-row or multi-row configuration. In an advantageous further development of the invention, exactly two axial bearings, each of a single-row configuration, are provided.

Thanks to only three bearings in the form of two axial bearings and one radial bearing, the rolling bearing is light and compact overall.

In order to make the design even more compact, in a further development of the invention the ball races of the radial ball bearing can be made smaller than the races of the axial roller bearing. In particular, a ball diameter of the radial ball bearing may be smaller in size than a roller diameter of the rollers of the two axial bearings. In a further development of the invention, the ball diameter of the radial ball bearing may amount to about 30% to 85% or 40% to 60% of the roller diameter of the axial bearings. If tapered roller bearings rather than cylindrical roller bearings are provided as axial bearings, the diameter of the conical body at its center, i.e. the mean cone diameter, can be meant by the roller diameter specified. Despite the reduced ball diameter, the resulting radial forces can be dissipated in a sufficient manner, since the balls in their dimensioning do not need to take into account the tilting or overturning problem of rollers. Under adverse deformation conditions, rollers in radial races tend to tilt or fall over, for which reason the rollers in radial races are often dimensioned larger than they should be by service life calculation. This problem does not occur with balls in radial races, so that at this point the balls can be dimensioned purely for service life. This enables a comparatively smaller dimensioning of the balls and ball races, which results in an optimization potential with regard to the construction volume of the large rolling bearing.

In an advantageous further development of the invention, the radial races of the radial bearing are already preloaded during assembly. The balls of the radial bearing are installed with preload in that the gap dimension between the ball races and/or the curvature of the ball races, which occurs in the undeformed state of the two races, has a radius smaller than a radius of the ball bodies of the ball bearing, and elastic deformation or preload of the ball bodies and the races or bearing races occurs when the bearing is mounted. The ball bodies and/or the ball tracks of the radial ball bearing may already be slightly deformed by the preload installation in the load-free condition, i.e. free from external loads induced from the adjacent construction.

Preload of the radial ball bearing in this way makes the bearing even less sensitive to elastic deformation and to tilting due to changing external loads, as is often the case, for example, with blade bearings in wind turbines in the form of center-free large rolling bearings.

Said preload can be a radial preload.

Ball races of the radial ball bearing can be configured in the form of a two-point contact track or in the form of a four-point contact track, wherein mixed forms are also possible in which one track is configured as a two-point contact track and the other track as a four-point contact track.

The two axial bearings can be configured in the form of cylindrical roller bearings or in the form of tapered roller bearings, although mixed forms are also possible here, so that one of the axial bearings is a tapered roller bearing and the other axial bearing is a cylindrical roller bearing. In particular, however, both axial bearings can be configured as cylindrical roller bearings or both axial bearings can be configured as tapered roller bearings, in which case an X or O arrangement of the tapered bearings can be provided.

Irrespective of how the rolling elements of the axial bearings are configured, the axial races can be inclined at a certain angle, in particular at an acute angle to a plane perpendicular to the axis of rotation of the bearing. In particular, however, the axial raceways can also be parallel to a plane perpendicular to the bearing axis.

In further embodiments of the invention, the two axial bearings may be disposed on opposite sides of the lug ring to support the lug ring in opposite directions in the groove.

Independently, the two axial bearings may be arranged in two spaced planes, each of which may extend perpendicular to the axis of the bearing. The radial bearing is advantageously arranged between the two planes specified hereinabove, in which the axial bearings are positioned. In other words, the radial bearing can be arranged between the two axial bearings when viewed in the radial direction, in particular approximately centrally. If the bearing is viewed in a longitudinal section, one axial bearing may be arranged above the radial bearing and the other axial bearing may be arranged below the radial bearing.

In an advantageous further embodiment of the invention, the two axial bearings may have at least approximately the same raceway diameter or at least overlap when the rolling bearing is viewed in a viewing direction parallel to the bearing axis of rotation.

The radial bearing advantageously has a raceway diameter that is larger than the raceway diameter of all axial bearings or smaller than the raceway diameter of all axial bearings, so that the radial bearing is radially offset relative to the axial bearings.

BRIEF DESCRIPTION OF THE DRAWINGS

The invention is explained in more detail below on the basis of a preferred exemplary embodiment and the corresponding drawings. The drawings show:

FIG. 1: shows a longitudinal half-section of an center-free large rolling bearing according to an advantageous embodiment of the invention, in which the two bearing races are supported against each other by two axial bearings in the form of cylindrical roller bearings and one radial bearing in the form of one ball bearing.

DETAILED DESCRIPTION

As FIG. 1 shows, the rolling bearing 1 can comprise two bearing races 2 and 3, of which one bearing race 2 forms an inner ring and the other bearing race 3 forms an outer ring. Said inner ring 2 can have a smaller inner diameter than the outer ring 3 and/or the outer ring 3 can have a larger outer diameter than the inner ring 2.

The one bearing race 3, preferably the outer ring, can have a groove 4 which is open toward the other bearing race 2, preferably toward the inner ring, and into which the other bearing race 2 engages with a lug ring 5 that is provided thereon so as to form a gap or with spacing on all sides. Said groove 4 can advantageously encompass the lug ring 5 from four sides, namely on two opposing sides of the lateral surface and on two opposing sides of the front side of the lug ring 5.

Here, said groove 4 has a—roughly—U-shaped bottom contour in which the groove bottom—right and left in FIG. 1—is encompassed by two bearing ring limbs. Furthermore, the groove 4 can have a transversely projecting prolongation 4a on a side opposite the bottom of the groove, which encompasses the front of lug ring 5 on a side opposite the bottom of the groove. Overall, said groove 4 can be configured such that it is undercut. To be able to inset the lug ring 5 into the groove 4, the bearing race 2 with the groove 4 can be composed of a support ring 6 and a retaining ring 7 that can be placed on the support ring, cf. FIG. 1.

As FIG. 1 shows, the lug ring 5 can be supported opposite the groove by two axial bearings 8 and 9 and by one radial bearing 7. Advantageous here is that the two axial bearings 8, 9 are disposed on opposite lug ring end faces. The radial bearing 7 may be arranged on an outer peripheral side of said lug ring 5.

Both the radial bearing 7 and the two axial bearings 8 and 9 can be arranged in the overall approximately U-shaped gap which results between the groove and the lug ring 5 sinking into it.

As FIG. 1 shows, the two axial bearings 8 and 9 are configured as roller bearings, wherein the rolling elements of the axial bearings 8 and 9 can be cylindrical rollers, for example. As specified at the beginning, however, tapered roller bearings can also be provided.

In the embodiment shown, single-row cylindrical roller bearings are provided as axial bearings 8 and 9. However, two-row or multi-row roller bearings could also be provided as axial bearings 8 or as axial bearings 9, wherein in the case of a multi-row arrangement the raceways of the axial bearings 8, 9 for the plurality of rows can be arranged offset with respect to one another or one from another.

The radial bearing 7 is configured as a ball bearing, cf. FIG. 1.

The ball diameter of the balls of the radial bearing 7 is advantageously significantly smaller than the roller diameter of the cylindrical or conical rolling elements of the two axial bearings 8 and 9.

As specified at the beginning, the radial bearing 7 is mounted under preload.

As FIG. 1 shows, the two radial bearings 7 can have substantially the same raceway diameter. If the rolling bearing 1 is viewed in the direction of its bearing axis of rotation 6—i.e. in the axial direction—the two axial bearings 8 and 9 overlap at least partially, in particular also completely.

The radial bearing 7 has a raceway diameter that is larger or smaller than the raceway diameter of the axial bearings 8 and 9, so that the radial bearing 7 is arranged offset in the radial direction with respect to the axial bearings 8 and 9.

As FIG. 1 shows, the radial bearing 7 is arranged approximately centrally between the two axial bearings 8 and 9, in particular approximately centrally between the two planes in which the two axial bearings 8 and 9 are arranged, which planes extend perpendicularly to the bearing axis of rotation 6.

As FIG. 1 shows, the two axial bearings 8 and 9 can be of identical design to each other, i.e. they can each be cylindrical roller bearings with the same cylinder diameter, for example. Alternatively, there can also be used tapered roller bearings that are identical to each other. Alternatively, axial bearings 8 and 9 of different design can also be used.

The space formed between the lug ring 5 and the groove 4 may be sealed by two rotary seals 10 to prevent ingress of dirt or leakage of lubricant.

As FIG. 1 shows, one of the two races 2, 3 can be provided with a toothing 11, for example the inner race 2, in order to be able to rotate the two races with respect to one another by means of a suitable rotary drive, for example comprising a drivable pinion.

At least one of the two races 2 and 3 may be segmented. In particular, the bearing ring having the groove 4, in particular the outer ring 3, can be configured to be split in order to be able to mount the lug ring 5 in the groove 4 in a simple manner.

We claim:

1. A center-free large rolling bearing comprising:
exactly two axial bearings;
exactly one radial bearing;
a first race having a first track; and
a second race having a second track, wherein the second race is concentric with the first race, wherein the first race has a groove open toward the second race, wherein the second race has a lug ring which engages in the groove, wherein the lug ring is supported on the groove by the two axial bearings and the one radial bearing, wherein the two axial bearings are configured as roller bearings, wherein the one radial bearing comprises a ball bearing,
wherein the one radial bearing has balls, wherein a ball diameter of the balls of the one radial bearing is smaller than a roller diameter of the two axial bearings,
wherein the first race having the groove has a split configuration having a split plane between the one radial bearing and one of the two axial bearings,
wherein the balls of the one radial bearing are installed with a preload against the first track and the second track, wherein a curvature of the first track and the second track, which occurs in an undeformed state of the first track and the second track, has a radius smaller than a radius of the balls of the one radial bearing, wherein elastic deformation of the balls of the one radial bearing and of the first track and the second track occurs due to the preload,
wherein the first track and the second track are each configured in the form of a two-point contact track,
wherein the curvature of the first track and the second track is in a cross-sectional plane having a bearing axis of rotation.

2. The center-free large rolling bearing of claim 1, wherein the ball diameter is 30% to 85% of the roller diameter.

3. The center-free large rolling bearing of claim 1, wherein the ball diameter is 40% to 60% of the roller diameter.

4. The center-free large rolling bearing of claim 1, wherein the two axial bearings are arranged in two planes spaced apart from one another and extending perpendicularly to the axis of rotation of the bearing, and wherein the one radial bearing is centrally arranged between the two planes.

5. The center-free large rolling bearing of claim 1, wherein the two axial bearings are arranged on opposite end faces of the lug ring and the one radial bearing is arranged on an outer circumferential surface of the lug ring between the end faces thereof.

6. The center-free large rolling bearing of claim 1, wherein the two axial bearings overlap one another viewed in the direction of its axis of rotation of the center-free large rolling bearing, the two axial bearings having identical raceway diameters.

7. The center-free large rolling bearing of claim 1, wherein the one radial bearing has a raceway diameter which is larger or smaller than all raceway diameters of the two axial bearings.

8. The center-free large rolling bearing of claim 1, wherein the two axial bearings are formed identically to one another and have rolling elements with the same diameter and the same width.

9. The center-free large rolling bearing of claim 1, wherein the two axial bearings each comprise cylindrical roller bearings in a single row.

10. The center-free large rolling bearing of claim 1, wherein the one radial bearing is configured in a single row.

11. The center-free large rolling bearing of claim 1, wherein one of the races has teeth for engagement with a rotary drive pinion.

12. The center-free large rolling bearing of claim 1, wherein the split plane is perpendicular to a bearing axis of rotation in the region of the groove.

13. A wind turbine comprising:
a rotor rotatably mounted on a gondola and on which a plurality of rotor blades are each mounted rotatably about their rotor blade longitudinal axis, the gondola being mounted on a tower rotatably about an upright axis; and
a center-free large rolling bearing of claim 1 in each case for the rotatable mounting of the gondola and/or for the rotatable mounting of the rotor blades.

14. A center-free large rolling bearing comprising:
exactly two axial bearings;
exactly one radial bearing;
a first race having a first track; and
a second race having a second track, wherein the second race is concentric with the first race, wherein the first race has a groove open toward the second race, wherein the second race has a lug ring which engages in the groove, wherein the lug ring is supported on the groove by the two axial bearings and the one radial bearing, wherein the two axial bearings are configured as roller bearings, wherein the one radial bearing comprises a ball bearing,
wherein the one radial bearing has balls, wherein a ball diameter of the balls of the one radial bearing is smaller than a roller diameter of the two axial bearings,
wherein the first race having the groove has a split configuration having a split plane between the one radial bearing and one of the two axial bearings,
wherein the balls of the one radial bearing are installed with a preload against the first track and the second track, wherein a curvature of the first track and the second track, which occurs in an undeformed state of the first track and the second track, has a radius smaller than a radius of the balls of the one radial bearing, wherein elastic deformation of the balls of the one radial bearing and of the first track and the second track occurs due to the preload,
wherein the first track and the second track are each configured in the form of a two-point contact track,
wherein the ball diameter of the balls of the one radial bearing ranges from 40% to 60% of the roller diameter of the roller of the axial bearings,
wherein the split plane dividing the first race into two race parts, is ranged between the one radial bearing and one of the two axial bearings such that the split plane is spaced apart in an axial direction from each of the one radial bearing and the one of the two axial bearings, and
wherein the curvature of the first track and the second track is in a cross-sectional plane having a bearing axis of rotation.

* * * * *